United States Patent
Kern et al.

(10) Patent No.: US 8,436,564 B2
(45) Date of Patent: May 7, 2013

(54) NATURAL COMMUTATION FOR THREE PHASE BRUSHLESS DIRECT CURRENT (BLDC) MOTORS

(75) Inventors: Lynn R. Kern, Tucson, AZ (US); Vadim Konradi, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 442 days.

(21) Appl. No.: 12/874,187

(22) Filed: Sep. 1, 2010

(65) Prior Publication Data

US 2012/0049777 A1    Mar. 1, 2012

(51) Int. Cl.
*H02K 29/06* (2006.01)

(52) U.S. Cl.
USPC ............ 318/400.32; 318/400.01; 318/400.35; 318/400.36; 318/400.38; 318/636

(58) Field of Classification Search ............. 318/400.01, 318/400.02, 400.04, 400.14, 400.16, 400.32, 318/400.33, 400.34, 400.35, 400.36, 400.38, 318/432, 434, 437, 599, 609, 610, 636, 718, 318/721, 799; 388/804, 811, 854, 901, 928.1
See application file for complete search history.

(56) References Cited

U.S. PATENT DOCUMENTS

| | | | |
|---|---|---|---|
| 4,259,630 A | 3/1981 | Killian | |
| 4,509,004 A | 4/1985 | Shepard, Jr. | |
| 4,510,422 A | 4/1985 | Ogura | |
| 4,678,973 A | 7/1987 | Elliott et al. | |
| 4,779,034 A | 10/1988 | Shepard, Jr. | |
| 5,017,845 A | 5/1991 | Carobolante et al. | |
| 5,198,733 A | 3/1993 | Wright | |
| 5,315,225 A | 5/1994 | Heinrich et al. | |
| 5,343,127 A | 8/1994 | Maiocchi | |
| 5,350,984 A | 9/1994 | Carobolante et al. | |
| 5,397,972 A | 3/1995 | Maiocchi | |
| 5,455,885 A | 10/1995 | Cameron | |
| 5,517,095 A * | 5/1996 | Carobolante et al. | .... 318/400.35 |
| 5,572,097 A | 11/1996 | Cameron | |
| 5,614,797 A | 3/1997 | Carobolante | |

(Continued)

OTHER PUBLICATIONS

"8904. 3-Phase Brushless DC Motor Controller/Driver With Back-EMF Sensing"; Allegro Microsystems, Inc.; Oct. 31, 2006; 18 pages.

(Continued)

*Primary Examiner* — Antony M Paul
(74) *Attorney, Agent, or Firm* — King & Spalding L.L.P.

(57) ABSTRACT

A control method for a sensor-less, brushless, three-phase DC motor. A pulse-width modulation (PWM) duty cycle may be calculated. A voltage induced by rotation of a rotor may be sampled at a first expected zero crossing value to produce a first sampled voltage value. An average of a plurality of sampled voltage values, including voltage values sampled at a plurality of prior expected zero crossing values and the first sampled voltage value, may be calculated. The first sampled voltage value may be subtracted from the calculated average to produce a delta zero crossing error (ZCE). The current value of an integral term corresponding to a rotational period may be updated according to the sign of the ZCE. The integral term may be updated periodically and multiple times during each rotational period. The ZCE may be subtracted from the integral term, and the resulting value may be used to generate one or more time values. Operation of the motor may be controlled based on the one or more time values and the PWM duty cycle.

22 Claims, 7 Drawing Sheets

U.S. PATENT DOCUMENTS

| | | | |
|---|---|---|---|
| 5,668,449 | A | 9/1997 | Carobolante |
| 5,731,670 | A | 3/1998 | Galbiati et al. |
| 5,818,192 | A | 10/1998 | Nozari |
| 5,929,577 | A | 7/1999 | Neidorff et al. |
| 6,100,656 | A | 8/2000 | El-Sadi et al. |
| 6,388,416 | B1 * | 5/2002 | Nakatani et al. ............. 318/700 |
| 6,473,562 | B1 | 10/2002 | Stephan |
| 6,512,342 | B2 | 1/2003 | Kawagoshi |
| 6,639,371 | B2 | 10/2003 | Walters et al. |
| 6,642,681 | B2 | 11/2003 | Kawabata et al. |
| 6,826,499 | B2 | 11/2004 | Colosky et al. |
| 6,995,530 | B2 | 2/2006 | Biamonte et al. |
| 7,054,980 | B2 | 5/2006 | Wurzburg |
| 7,096,134 | B2 | 8/2006 | Miller, Jr. |
| 7,183,734 | B2 | 2/2007 | Lassen |
| 7,202,623 | B2 | 4/2007 | Zhou et al. |
| 7,294,982 | B2 * | 11/2007 | Kurosawa et al. ......... 318/400.2 |
| 7,432,677 | B2 | 10/2008 | Heydt et al. |
| 7,589,484 | B2 * | 9/2009 | Sosseh et al. .............. 318/400.3 |
| 7,915,844 | B2 * | 3/2011 | Kurosawa et al. ......... 318/400.4 |
| 2001/0048278 | A1 | 12/2001 | Young et al. |
| 2008/0297081 | A1 | 12/2008 | Morita et al. |
| 2009/0049463 | A1 | 2/2009 | Ueda |
| 2009/0049464 | A1 | 2/2009 | Kang |
| 2009/0096397 | A1 | 4/2009 | Paintz et al. |

OTHER PUBLICATIONS

Ken Berringer, Bill Lucas, Leos Chalupa, and Libor Prokop; "Sensorless Brushless dc Motor Using the MC68HC908MR32 Embedded Motion Control Development System—AN 1858"; Freescale Semiconductor; 2004; 36 pages.

"XC164CM—Driving of a Brushless DC Motor without Sensors—AP 16090"; Infineon Technologies; 2006; 75 pages.

"IRMCF371—Sensorless Motor Control IC for Appliances"; International Rectifier; Dec. 5, 2006. 30 pages.

Jorge Zambada; "AN1078—Sensorless Field Oriented Control of PMSM Motors"; Microchip Technology Inc.; 2007; 30 pages.

"Sensorless Spindle Motor Controller—ML4411/ML4411A"; Micro Linear; May 1997; 15 pages.

"TDA5140A—Brushless DC Motor Drive Circuit"; Philips Semiconductors; Apr. 1994; 24 pages.

"Brushless Motor Driver with Speed Control for Portable Cassette Recorders—LB1877V"; SANYO Electric Co., Ltd.; Aug. 1999; 7 pages.

"Fan Motor Driver—LV8800V"; Sanyo Semiconductor Co., Ltd; Aug. 2007; 8 pages.

"Sensorless Brushless DC Motor Reference Design—AN208"; Silicon Laboratories; 2006; 40 pages.

"Autonomous Three Phase Fan Controller—EMC3000"; Standard Microsystems Corporation; 2006; 8 pages.

"An Introduction to Sensorless Brushless DC Motor Drive Applications with the ST72141—AN1130"; ST Microelectronics; 2000; 29 pages.

"3-Phase Full-Wave Sensorless Controller for Brushless DC Motors—TB6537P/PG, TB6537F/FG"; Toshiba; Aug. 4, 2003; 17 pages.

"Sensorless Brushless DC Motor Control with Z8 Encore! MC Microcontrollers—AN022601-0905"; ZiLOG; 2005; 64 pages.

* cited by examiner

NATURAL COMMUTATION FOR THREE PHASE BRUSHLESS DIRECT CURRENT (BLDC) MOTORS

INCORPORATION BY REFERENCE

U.S. patent application Ser. No. 12/393,996, titled "Brushless, Three Phase Motor Drive", filed Feb. 26, 2009 and whose inventors are Lynn R. Kern and James P. McFarland; U.S. provisional application Ser. No. 61/108,320 titled "Sensor-less, Brushless, Three Phase Motor Drive", filed on Oct. 24, 2008 and whose inventor is Lynn R. Kern; U.S. patent application Ser. No. 12/620,726, titled "Brushless, Three Phase Motor Drive", filed Nov. 18, 2009 and whose inventors are Lynn R. Kern, Scott C. McLeod, and Kenneth W. Gay; U.S. patent application Ser. No. 12/620,656, titled "System and Method for Inducing Rotation of a Rotor in a Sensorless Motor", filed on Nov. 18, 2009 and whose inventors are Lynn R. Kern and James P. McFarland; and U.S. patent application Ser. No. 12/632,495, titled "Drive Method to Minimize Vibration and Acoustics In Three Phase Brushless DC (TPDC) Motors", filed Dec. 7, 2009 and whose inventors are Lynn R. Kern and James P. McFarland are all hereby incorporated by reference in their entirety as though fully and completely set forth herein.

BACKGROUND OF THE INVENTION

1. Field of the Invention

The invention generally relates to DC (Direct Current) motors used in various applications, such as hard disk drive motors, cooling fans, drive motors for appliances, etc.

2. Description of the Related Art

Electric motors are used to produce mechanical energy from electrical energy, used in a number of applications, including different household appliances, pumps, cooling fans, etc. Electric motors are generally classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force (EMF).

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on an axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor, the commutator/brush-gear-assembly (which is effectively a mechanical "rotating switch") is replaced by an external electronic switch that's synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over DC motors featuring brushes, including higher efficiency and reliability, reduced noise, longer lifetime (no brush erosion), the elimination of ionizing sparks from the commutator, and overall reduction of electromagnetic interference (EMI).

One issue oftentimes taken into consideration when designing motors, more specifically brushless motors, is the power required to operate the motor. One technique to reduce power in some applications has been the introduction of Three Phase Brushless DC (TPDC) Motors. Such motors are used in a variety of applications, for example in driving cooling fans. The drive electronics for such motors typically rely on Hall elements (Hall effect sensors) to detect the absolute position of the rotor at all times, and switch drive transistors to maintain motor rotation. A Hall effect sensor is a transducer that varies its output voltage in response to changes in magnetic field. The motors are often electrically connected in a "Y" configuration, so named due to the resemblance to the letter "Y". The common point for the three coils is connected to the electrical source, and the drive electronics switch the drive transistors to maintain the rotating electro-magnetic field required to turn the motor.

A second method requires the use of six (6) drive transistors. In this configuration, one high-end low-side pair of transistors are turned on at any point in time, completing the electrical circuit through two of the three legs of the motor. Using the un-energized coil as a magnetic sensor to determine the rotor position is known as Back Electro-Motive Force (BEMF) detection. The motivation for this technique is the elimination of the relatively expensive Hall elements and associated electronics. BEMF commutation techniques have successfully been applied to a wide-range of motors. There are many different techniques for both basic commutation and enhanced techniques designed to improve the acoustic signature of the fan under operation. The architectures for these solutions can be said to fall into two basic categories, Mixed-Signal Micro-Controller Unit (MCU), or analog Application Specific Integrated Circuit (ASIC). The simplest of all these is the low-side commutation scheme.

There are currently a number of Analog ASIC solutions using differential commutation schemes. The range of complexity in these algorithms varies, with attempts to "soften" the startup current through various techniques, until the BEMF signal can be detected. The Analog ASIC solutions typically include the use of external components to generate reference ramps and saw-tooth waveforms to be used as references against motor coil responses. While analog solutions are more compact, they rely on external passive components to control the operational set-points in the IC. The Mixed- Signal MCU solutions typically include a micro-controller with various Analog-to-Digital Converter (ADC) modules, comparators, and in some cases filter modules. The MCU accurately controls timing, performs complex calculations and transformations, and enables communications directly with an external controller. High voltage solutions separate the electronics using either of these approaches and use external transistors and isolation.

The speed of the motor is typically controlled through one or more signals aimed at adjusting the power delivered to the rotor. The value or magnitude of the control signals is provided by input commands (oftentimes specifying a voltage value or PWM duty cycle value), and an error signal is developed based on the current speed of the motor and the desired speed as corresponding to the input command. According to the theoretical method, the slope of the BEMF signal is measured as the rotor passes the stator coil, and that information is used to determine the position of the rotor. A BEMF signal that is offset from its midpoint is indicative of the rotor's deviating from the electrical commutation. A BEMF signal that is too high and too early is indicative of the rotor's spinning faster than the electrical commutation, requiring that the next commutation period be lengthened. Likewise, a BEMF signal that is too low and too late indicates that the rotor is spinning slower than the electrical commutation, and the period should be shortened. Developing this type of error signal in digital circuitry in the past has required a microcontroller or microprocessor, and a high speed Analog-to-Digital converter (ADC). The alternative was to develop analog circuitry to generate reference pulse trains, and use analog components to phase lock to the BEMF signal.

Most, if not all of these solutions are designed for a specific motor type, and do not port well from application to application, or even from manufacturer to manufacturer. Each motor type requires tuning capacitors to adjust the commutation and startup frequencies, as well as crossover and dead-time locations in the commutation sequence. Some implementations do not control the frequency or duty cycle of the PWM signals going to the drive transistors, but rather allow the incoming PWM to modulate the signals directly. The inability to limit either frequency or duty cycle means the motor is not being driven optimally for a given operating point, but is under the control of an external device that may or may not be aware of the motor limitations. This typically causes the motor to use more current than required, producing additional heat that must be removed from the system.

Present solutions also fail to properly address the issue of over-current/lock rotor. The currents used are sufficient to damage the motor windings, and without a feedback method, a timer must expire before the damaging condition can be detected, and corrected. In some solutions, there is no provision for this event, and the motor will continue to drive to destruction. The prior art solutions use a brute-force method to drive the motor coils during start-up, and may last several seconds, drawing several times the normal operating current. The period of time when this occurs is referred to in the literature as the Forced Commutation phase of spin-up. This is one of the drawbacks of the BEMF commutation method. Until the motor spins sufficiently fast enough to generate a BEMF signal, the motor is driven open loop, at a pre-determined frequency and PWM duty cycle, putting undue stress on the motor components. The currents used are often sufficient to damage the motor windings, and without a feedback method, a timer must expire before the damaging condition can be detected, and corrected. In some solutions, there is no provision for this event, and the motor will continue to drive to destruction.

Other corresponding issues related to the prior art will become apparent to one skilled in the art after comparing such prior art with the present invention as described herein.

SUMMARY OF THE INVENTION

Various embodiments are presented of a system and method for controlling a brushless three-phase DC motor. The motor may be an electronic motor, and may include a rotor having one or more permanent magnets. The one or more permanent magnets may be physically positioned in-board or out-board of the stationary section of the motor, referred to as the stator, which may include a plurality of electromagnets, each electromagnet including a respective coil. The motor may include a voltage sensor configured to measure a voltage induced across one or more of the electromagnets. The voltage sensor may be part of the electromagnet. Each electromagnet may include such a voltage sensor, or alternatively, a voltage sensor may be usable to measure voltage for some or all of the electromagnets. Alternatively, the motor may comprise one or more Hall sensors or other equivalent sensors for measuring voltage.

The system may include logic (or a logic block) for controlling the operation of the motor. The logic may be analog or digital, e.g., the logic may include one or more state machine based controllers or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to iteratively perform certain steps. A pulse-width modulation (PWM) duty cycle may be calculated based on a minimum duty cycle and an input command. The input command may be scalable from the minimum duty cycle to a maximum duty cycle. The input command may be updatable at an adjustable interval, such as a number of iterations of the method, or an amount of time. The adjustable interval may be adjusted based on either 1) a number of intervals that have occurred since initiation (e.g. an initial iteration) of the method, or; 2) an amount of time that has occurred since initiation of the method; or 3) an estimated or calculated speed of the motor.

A voltage may be measured at a first expected zero crossing value. In one embodiment, the voltage induced by rotation of the rotor may be sampled at a first expected zero crossing value. The voltage may be induced across an undriven electromagnet of the plurality of electromagnets. Sampling this induced voltage may produce a first sampled voltage value. An average of a plurality of sampled voltage values may then be calculated. The plurality of sampled voltage values may include voltage values sampled at a plurality of prior expected zero crossing values and the first sampled voltage. The first sampled voltage value may then be subtracted from the calculated average to produce a delta zero crossing error (ZCE).

In one set of embodiments, the ZCE may be used in conjunction with an integral term associated with the rotational period, or angular velocity of the rotor, in controlling how power is delivered to each respective coil in the electromagnets of the stator. In this case, the rotational period (RP) is the inverse of angular velocity (AV). AV may be expressed as radians/second, resulting in an RP value that may be given in units of time, e.g. seconds, which may be the unit assigned to the rotational period, and hence to the integral term. In one set of embodiments, the RP may be one-fourth (¼) of the commutation period, when four slices are used to align the zero cross sample. In other embodiments RP may be one-eighth (⅛) of the commutation period, for example when it is desirable to have better control of the ZCE raw sample. The sign of the ZCE may be identified/determined, and used to add or subtract one count from the current value of the integral term according to the sign of the ZCE. The integral term may be updated periodically and multiple times during each rotational period. The ZCE may then be subtracted from the integral term, and the resulting value may be used directly as the rotational period used for determining the commutation timing of the electromagnets. In one set of embodiments, the count, or unit, which is added or subtracted from the current value of the integral term, may represent one count of a specified time period, or time unit. The value of the time period or time unit may be specified as desired. In this way, more generally, one or more time values may be generated from the integral term and the ZCE, and the one or more time values (e.g. rotational period) may be used for controlling commutation for the rotating motor.

Overall, operation of the motor may be controlled based on the one or more time values and a PWM duty cycle provided by way of the input command, and determined based on other, possibly additional factors. More specifically, the plurality of electromagnets on the stator may be driven by periodic bursts of current whose frequency and power may be specified by the PWM duty cycle in such a way as to drive the rotor at a particular rotational speed, while the one or more time values may determine the commutation timing of the electromagnets on the stator, such that the electromagnetic field of the stator may remain substantially in optimal alignment with the rotor, effecting an efficient transfer of power to the rotor at that particular rotational speed.

The above operations may repeat over a plurality of iterations. In one embodiment, the next zero crossing value from the previous iteration is used as the first expected zero crossing value in the next iteration.

BRIEF DESCRIPTION OF THE DRAWINGS

.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1A:
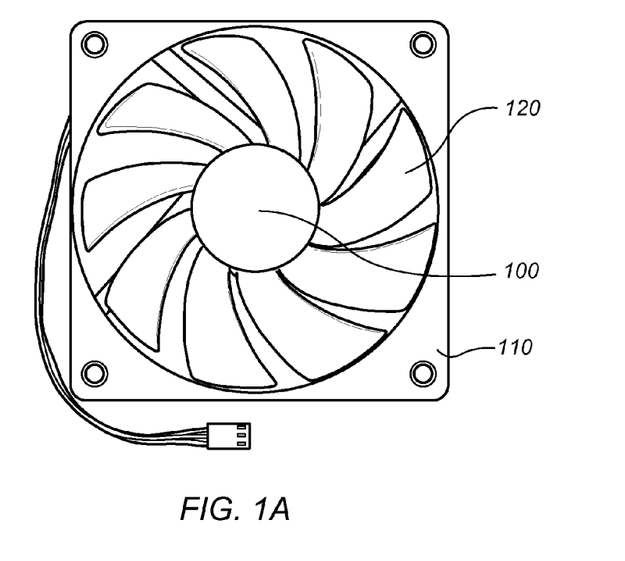
FIGS. 1A and 1B illustrate different views of an exemplary fan and fan motor.
Figure 1B:
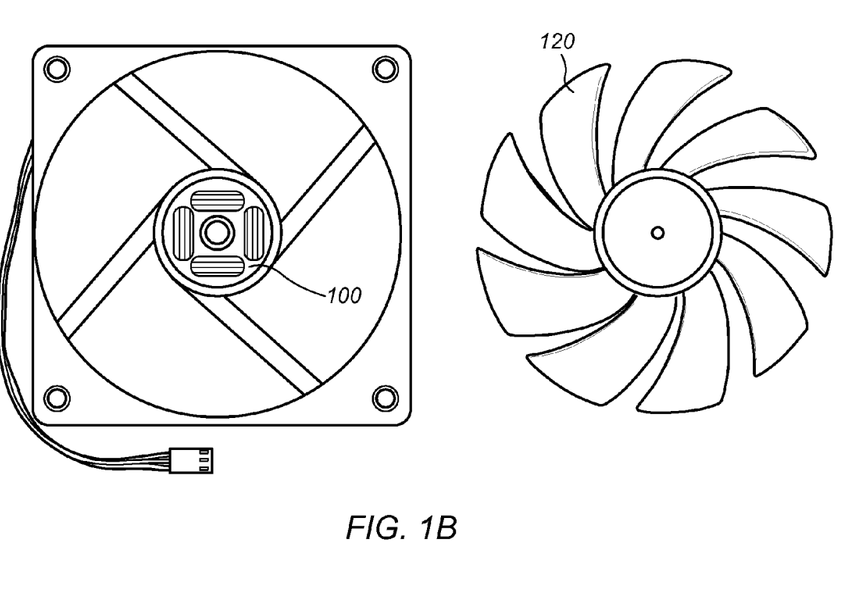

FIGS. 1A and 1B—Exemplary Fan and Fan Motor

FIGS. 1A and 1B illustrate an exemplary fan assembly 110 according to one embodiment. Fan 110 may be a cooling fan, for example a fan for use in a laptop or a desktop computer. Fan 110 may alternatively be a commercial or industrial fan, or in general any type of fan driven by a motor. Fan assembly 110 may include a motor assembly 100 as well as fan blades 120. Motor assembly 100 may comprise a motor (e.g. motor 102 shown in FIG. 5) as well as drive circuitry (for example, drive control logic 502 shown in FIG. 5) for controlling motor 102.

Although FIGS. 1A and 1B illustrate a fan as the load being driven by the motor, it should be noted that the system and method for controlling a motor as described herein may be suited for driving any of various types of loads, including without limitation hard disk drives, drive motors for appliances, propellers, wheels, pumps, or other loads.

Figure 2:
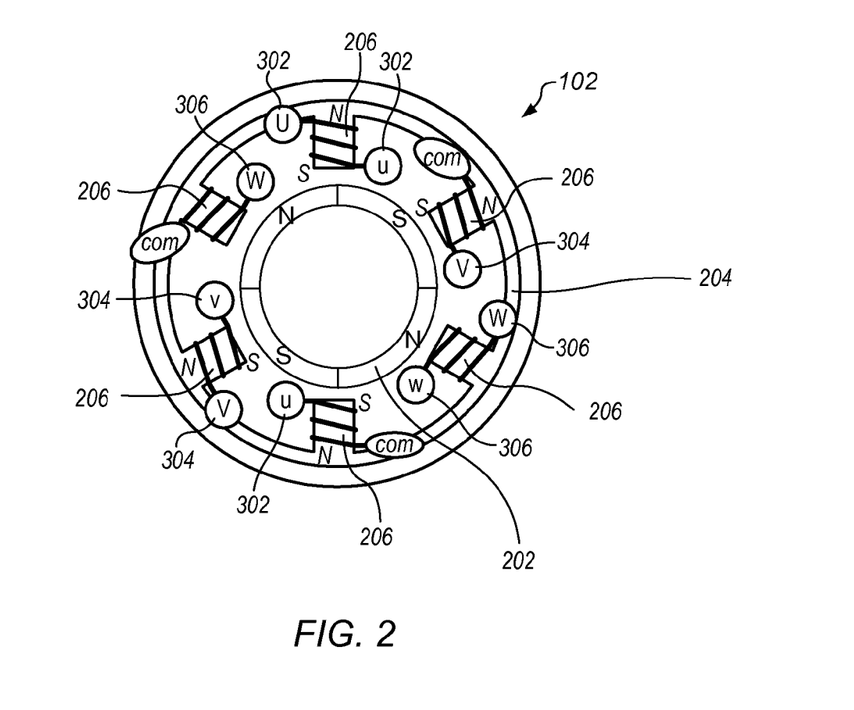
FIG. 2 illustrates a simplified diagram of one embodiment of a brushless four-pole three-phase electric motor.

FIG. 2—Brushless Four-Pole Three-Phase Motor

FIG. 2 illustrates a simplified diagram of an exemplary brushless four-pole three-phase motor 102. Motor 102 may be electrically powered, e.g., by direct current (DC) electricity. Motor 102 may also be electronically controlled, and may include a rotor 202, which may include one or more permanent magnets Rotor 202 may have four poles as shown, with alternating North "N" and South "S" poles. Alternatively, rotor 202 may include two, six or any other number of poles as desired. Motor 102 may include a stator 204 including a plurality of electromagnets 206, positioned around rotor 202. There may be six electromagnets 206, which may be arranged such that they are equally spaced with respect to each other around stator 204. Electromagnets 206 may be arranged as three pairs of electromagnets 206, such that each pair of electromagnets may be powered in a different phase than the other (remaining) pairs of electromagnets. The three pairs of electromagnets 206 may be connected in a "Y" configuration, making motor 102 a three-phase motor. Motor 102 may be brushless, e.g., it may not include any brushes relaying current to rotor 202. Additionally, motor 102 may be sensor-less, e.g. it may not include a discrete rotor position sensing mechanism such as one or more Hall sensors (e.g. the Hall sensors shown in FIG. 4). In another embodiment, motor 102 may include Hall sensors. Two of the three pairs of electromagnets 206 on stator 204 may be driven to induce or maintain rotation of rotor 202 at any given time. Motor 102 may then utilize one of the undriven electromagnets of stator 204 to indirectly detect the position of rotor 202 (or it may use Hall sensors for detection). The phases of stator 204 may be driven in a pattern ideally configured to induce rotation of rotor 202. The polarity of electromagnets 206 may be periodically commutated as part of this pattern.

Figure 3:
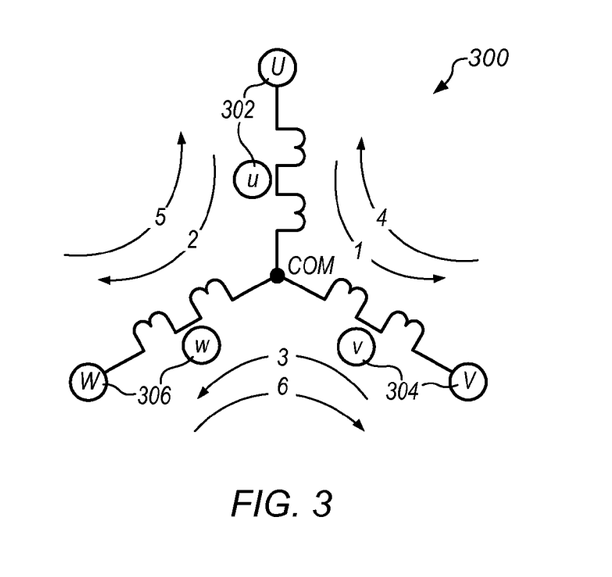
FIG. 3 illustrates the commutation pattern of a brushless three-phase electric motor according to one embodiment.

FIG. 3—Commutation Pattern of a Brushless Three-Phase Motor

FIG. 3 illustrates a simplified circuit diagram depicting a commutation pattern of a brushless three-phase motor according to one embodiment. Motor 102 may be a brushless, three-phase DC motor as described above. Electromagnets 206 may be connected in a "Y" configuration as shown. Motor 102 may also be a sensor-less motor as also described above, e.g. it may utilize an undriven stator electromagnet to indirectly detect the position of the rotor. In alternate embodiments, motor 102 may include Hall sensors to detect the position of rotor 202. Motor 102 may determine the timing of each commutation of the commutation pattern according to one embodiment of a method described herein. To control rotation of rotor 202, two pairs of the electromagnets on stator 204 may be driven at any one time. A given pair may be driven on the 'high-side' or the 'low-side', indicating in which direction current is being conducted in the windings of the driven pair of electromagnets. Depending on the number of poles in rotor 202, the electromagnets of a given pair of electromagnets may be wound in the same direction or in opposite directions. For example, with a four-pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high-side' and 'low-side' may depend on the magnetic configuration of rotor 202. Other naming and/or driving conventions are also possible and are contemplated.

A commutation cycle may include six phases. The phases may correspond to the numbered arrows ('1' through '6') shown in FIG. 3. In FIG. 3, each arrow points from the high-side driven pair to the low-side driven pair. Thus for example, arrow '1' may indicate that in the first phase of the commutation cycle, 'U' electromagnet pair 302 may be driven on the high-side, while 'V' electromagnet pair 304 may be driven on the low-side, with 'W' electromagnet pair 306 remaining undriven. Arrow '2' may then indicate that in the second phase of the commutation cycle, 'U' electromagnet pair 306 may again be driven on the high-side, while 'W' electromagnet pair 304 may be driven on the low-side, with 'V' electromagnet pair 302 remaining undriven. Each of the remaining numbered phases (illustrated by arrows '3' through '6') would operate in a similar manner to create a full commutation cycle, which may be repeated to increase, maintain, or otherwise affect rotation of rotor 202.

If motor 102 is a DC powered motor, rotational speed may be controlled by means of pulse width modulation (PWM) of the electromagnets. Generally speaking, a PWM duty cycle may indicate how fast rotor 202 should rotate. More specifically, the PWM duty cycle may specify how often and with how much power to drive electromagnets 206 of stator 202.

As noted above, one pair of electromagnets may remain undriven during each phase of the commutation cycle. If rotor 202 is rotating, the movement of the one or more permanent magnets in rotor 202 past the undriven electromagnet may cause an induced voltage in the undriven electromagnet. Thus, during each phase of the commutation cycle, whichever pair of electromagnets is undriven may be used to sample the voltage induced by the rotation of the permanent magnet(s) in rotor 202 in one or both of those electromagnets. This is also known as Back Electro-Motive Force (BEMF) sampling. The sampled voltage may be used to help determine the present position and/or rotational velocity of rotor 202. The sampled voltage or information inferred from the sampled voltage may be used to control future commutation timing and/or other aspects of motor control according to various embodiments. As noted above, embodiments in which motor 102 includes Hall elements (i.e. Hall effect sensors) to detect the absolute position of the rotor, BEMF sampling may not be required, and therefore may not be used.

Figure 4:
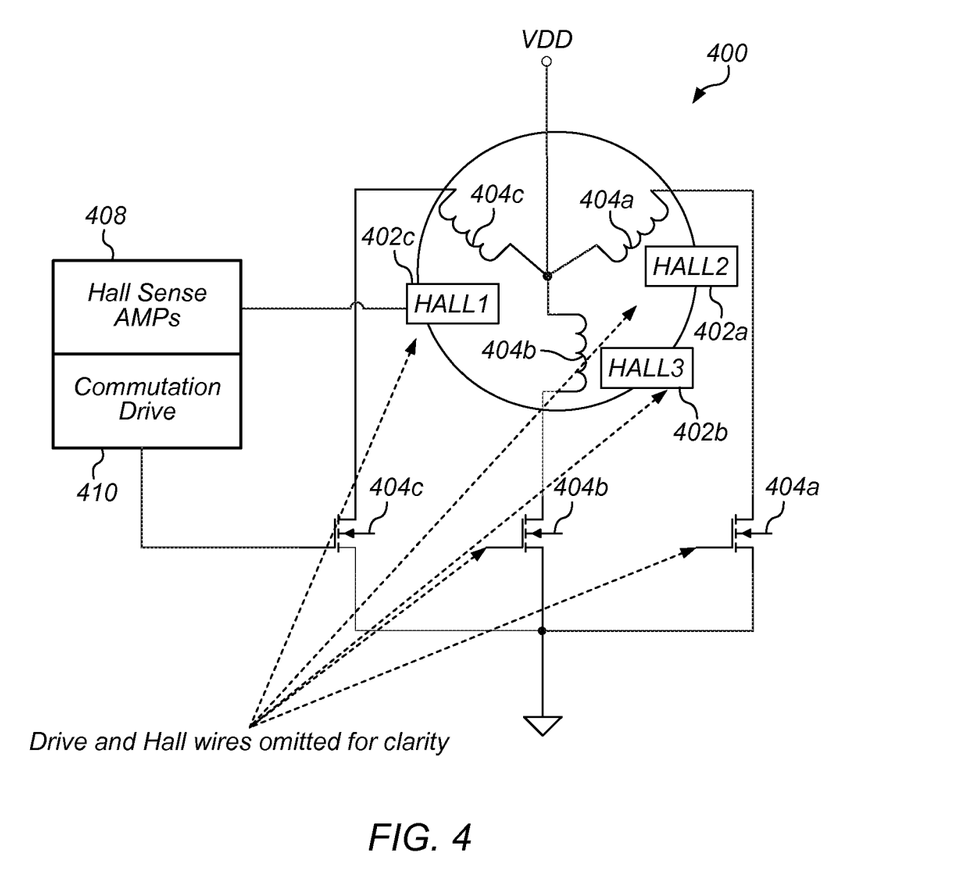
FIG. 4 is a circuit diagram of one embodiment of a motor with Hall Sensors and Hall Sense amplifiers.

FIG. 4—Circuit Diagram of a Motor with Hall Sensors and Hall Sense amplifiers

As mentioned above, some motors may include Hall elements (or sensors) to detect the position of rotor 202. FIG. 4 illustrates a simplified circuit diagram depicting brushless DC motor 400 that includes Hall effect sensors 402a-402c. One advantage of brushless motors in general is the reduction in the power required to operate the motor. FIG. 4 is illustrative of one embodiment of a typical three-phase brushless DC (TPDC) motor. The drive electronics for motor 400 rely on Hall elements (Hall effect sensors) 402a-402c to detect the absolute position of the rotor at all times, and switch drive transistors (404a-404c) to maintain motor rotation. A Hall effect sensor may be a transducer that varies its output voltage in response to changes in magnetic field. Motor 400 may be electrically connected in a "Y" configuration as shown (and as also previously mentioned), so named due to the configuration's resemblance to the letter "Y". A common point for the three coils 404a-404c may be connected to the electrical source VDD, and drive electronics 410 may be operated to switch drive transistors 404a-404c to maintain the rotating electro-magnetic field required to turn motor 400.

Figure 5:
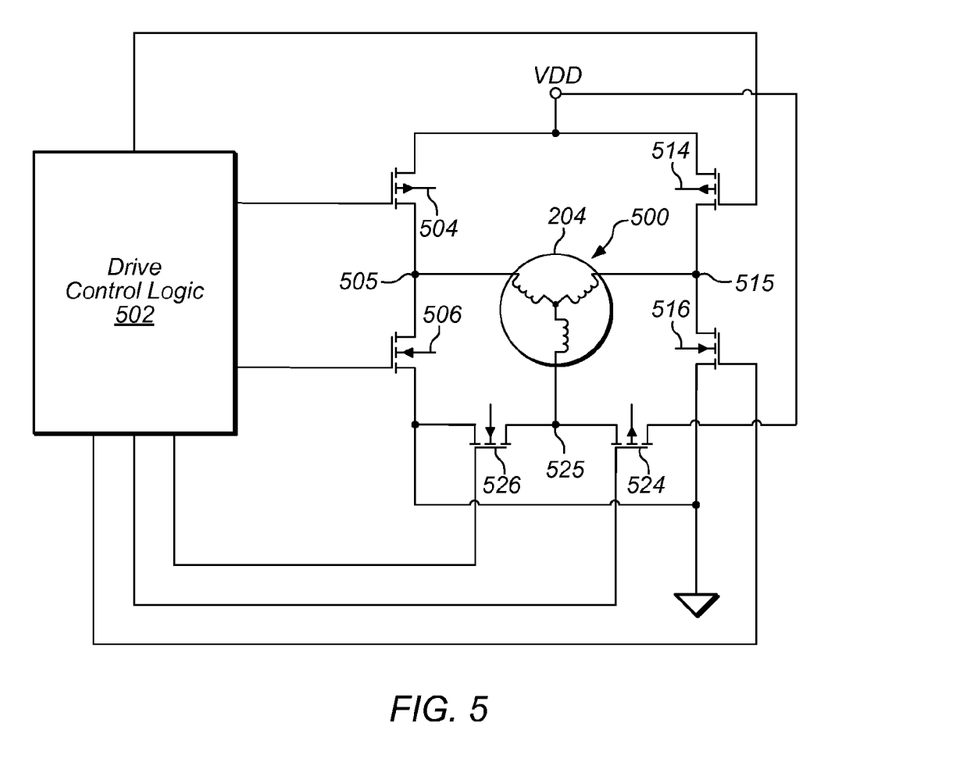
FIG. 5 is a circuit diagram of one embodiment of a motor with drive control logic.

FIG. 5—Circuit Diagram of a Motor with Drive Control Logic

FIG. 5 illustrates a simplified circuit diagram of a motor 500 (which may be similar to motor 102 shown in FIG. 2), and its drive control logic 502. In contrast to motor 400 shown in FIG. 4, motor 500 may use six drive transistors, as shown in FIG. 5. The drive transistors form a drive circuit to deliver power to the coils in the electromagnets on stator 204 of motor 500. In this configuration, one high-side pair of electromagnets and one low-side pair of electromagnets may be on at any point in time, completing the electrical circuit through two of the three legs (of the Y configuration) of the motor. As previously mentioned, in this case the un-energized coil may be used as a magnetic sensor to determine the rotor position, referred to as BEMF detection. The motor system shown in FIG. 5 therefore has the added benefit of eliminating the relatively expensive Hall elements and associated electronics (shown in FIG. 4).

Overall, motor 500 may be a sensor-less, brushless, three-phase motor as described above and illustrated in the various Figures. As shown, motor 500 may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high-side, or the other transistor may drive the pair on the low-side. For example, FET 504 may be the high-side transistor for the 'U' pair 302, while FET 506 may be the low-side transistor for the 'U' pair of electromagnets 302. Similarly, FETs 514 and 516 may be the respective high-side and low-side transistors for the 'V' pair of electromagnets 304, while FETs 524 and 526 may be the respective high-side and low-side transistors for the 'W' pair of electromagnets 306. In addition to the particular embodiment shown, any number of other wiring configurations (e.g. using a different number or types of transistors) are also be possible, and are contemplated.

The transistors for each pair of electromagnets may be controlled by drive control logic 502. Drive control logic 502 may be electronic logic configured to perform various operations as described herein, such as sampling voltages induced across the electromagnets, performing calculations (e.g. simple integer math or more complex operations) to determine values used for controlling the electromagnets, and/or sending control and/or power signals to the electromagnets. Drive control logic 502 may also receive signals from one or more outside control devices, such as a fan speed control device. For example, a fan speed control device might periodically send an input command indicating a desired change in motor velocity based on some outside condition, such as an ambient temperature, which drive control logic 502 might incorporate into its control calculations. Other outside control devices are also envisioned. Alternatively, such control devices may be incorporated into drive control logic 502 itself.

In addition to any steady state or natural commutation control logic functions described herein, drive control logic 502 may have logic for controlling the motor under other conditions; for example, drive control logic 502 may include logic for a DC excitation operation to align the rotor to a known position prior to beginning rotation; logic for a forced commutation operation to begin rotation of the rotor; logic for stopping rotation of the rotor; logic for determining if a stall condition exists; and/or logic for other functions, as well as logic for switching from one function to another at an appropriate time.

Drive control logic 502 may be any of various types of logic, e.g., analog or digital, or a combination thereof. For example, drive control logic 502 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, drive control logic 502 may include any combination of the above. Drive control logic 502 may thus be implemented using any of various digital or analog techniques, or a combination thereof, as would be apparent to one of ordinary skill in the art.

As previously mentioned, motor 500 may be a brushless, three-phase motor as described above and illustrated in the various Figures. Motor 500 may thus be structured and may operate as motor 102 described in FIG. 2. A steady state operation of motor 500 may be referred to as the natural commutation operation of the motor. Steady state or natural commutation may refer to operation of a motor once the rotor is already spinning. In other words, natural commutation may refer to maintaining or adjusting the rotation speed of the rotor once it is already in motion. In some embodiments a motor may use a different method (e.g. different control logic) for initiating rotation of a stationary rotor than it may use for maintaining or adjusting the rotation speed of an already rotating rotor.

Three-phase brushless motors, such as motor 500, may be driven with either sinusoidal or trapezoidal current waveforms. Classic drive schemes may rely on creating zero current switching in order to minimize the effects of changes in instantaneous torque. These periodic changes in torque occur when the coils are energized and de-energized, or commutated, producing mechanical vibrations and altering the inherent acoustic signature of the fan impeller. Both effects may be undesirable in many applications, including fans for the PC industry.

The effects of commutation on motor 500 may be minimized using a sinusoidal current drive on each coil. This may be accomplished in one of two ways, using a drive transistor as a linear pass device to create a sinusoidal current drive or to use a changing PWM duty cycle to create an effective sinusoidal current around each commutation point. However, each of these methods has some limitations. If a transistor is being used as a pass element to generate a sinusoidal current in the coil, any voltage in excess of the voltage needed for sinusoidal waveform generation may constitute energy that is lost through dissipation.

Use of a changing PWM duty cycle to create an effective sinusoidal current around each commutation point may not suffer from the losses of a linear pass element, but it may consume additional current, as there will be a minimum time when the current through any coil is zero. This may increase current consumption at any point where all three coils are driven. In one set of embodiments, in order to minimize the effects of the coils switching, the "on" times and/or "off" times of drive transistors in a full "H-bridge" drive scheme, such as the one shown in FIG. 5, may be delayed. That is, the respective "on" times and/or "off" times of transistor pairs 504 and 506, 514 and 516, and 524 and 526 may be delayed such that the respective drive signals provided to the electromagnets (and coils) between which the commutation occurs overlap. By overlapping the "on" times with respect to the commutation command or the "off" times with respect to the commutation command, it may be possible to minimize the effects of coils turning off. In addition to overlapping the off-timing (or on-timing), the waveform of the current conducted in the coils of the electromagnets may be shaped to minimize the instantaneous rotational torque generated as the coil turns off. The overlap times may be controlled by digital timers, making the response predictable and easily controlled.

Figure 6:
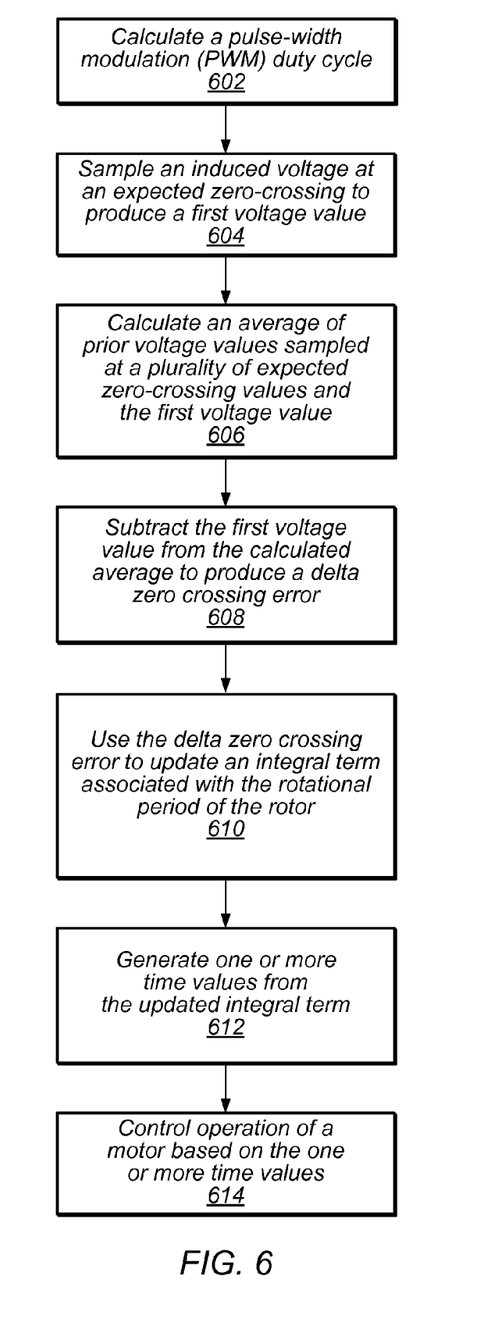
FIG. 6 is a flowchart diagram describing a method for operating a sensorless, brushless three phase motor according to one embodiment.
Figure 7A:
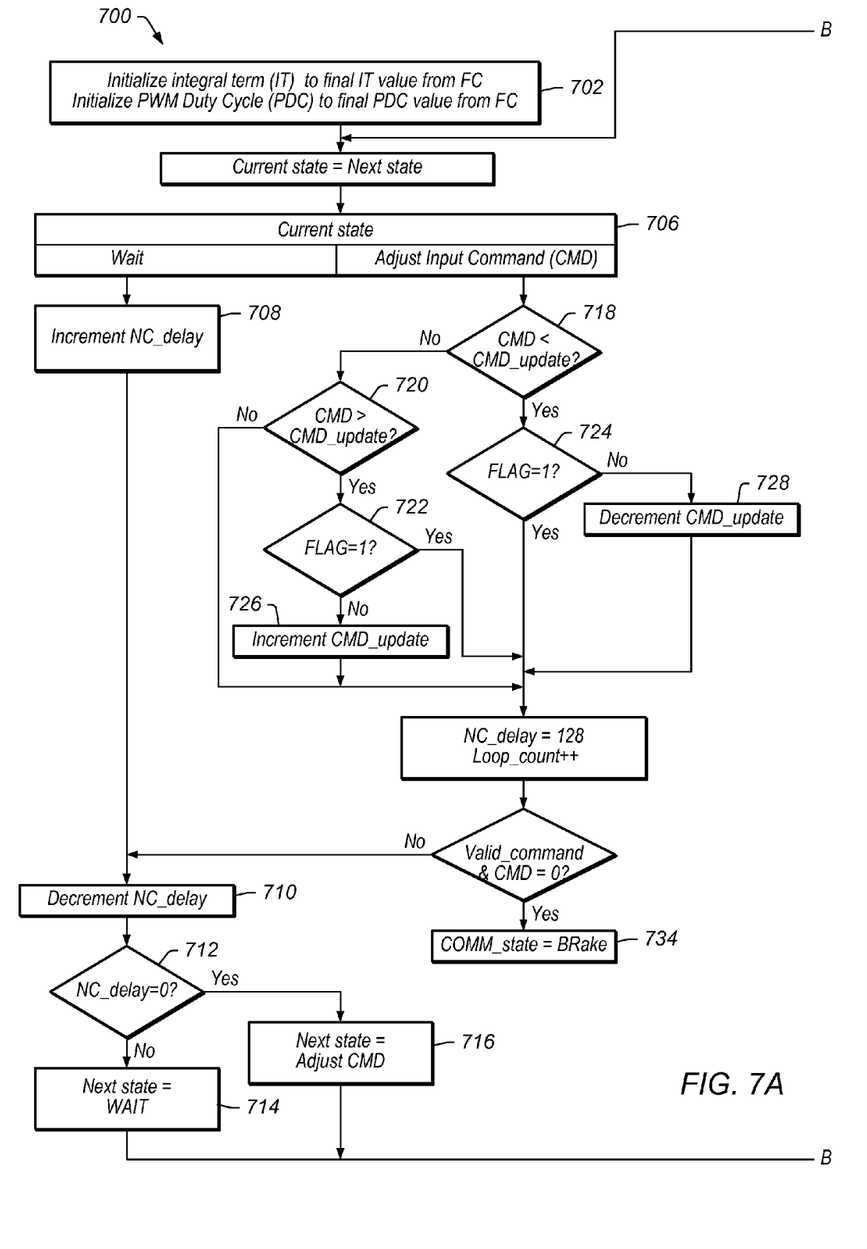
Figure 7B:
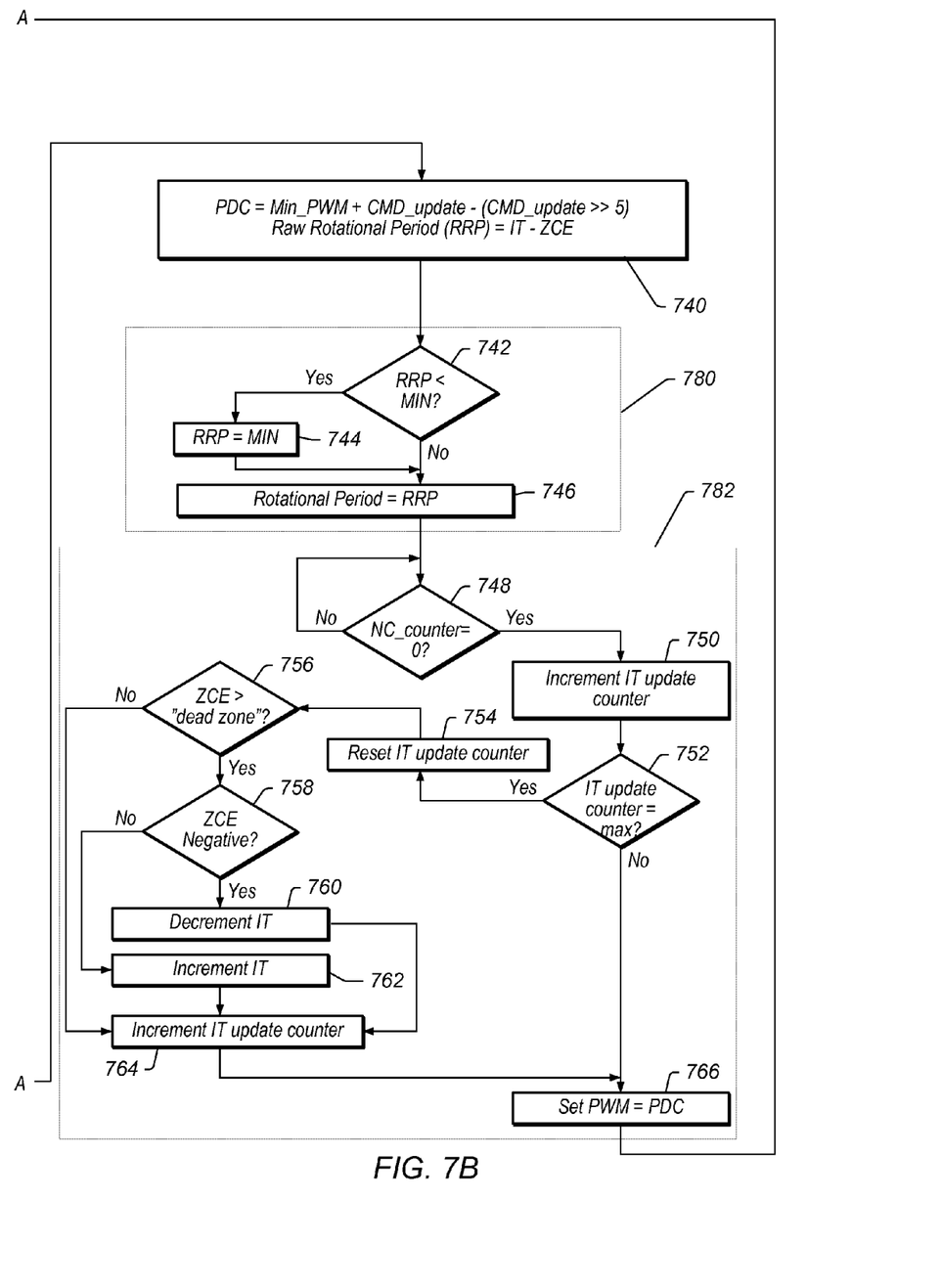

FIGS. 6 and 7a/b—Flowcharts Illustrating embodiments of a Method for Controlling Steady State Operation of a Motor FIG. 6 illustrates a method for controlling steady state operation of a motor according to one embodiment. A steady state operation of the motor may also be known as natural commutation operation of the motor. Steady state or natural commutation may refer to operation of a motor once the rotor is already spinning. In other words, natural commutation may refer to maintaining or adjusting the rotation speed of the rotor once it is already in motion. In some embodiments a motor may use a different method (e.g. different control logic) for initiating rotation of a stationary rotor than it may use for maintaining or adjusting the rotation speed of an already rotating rotor.

The motor may be a brushless, three-phase motor as previously described, and illustrated in the various Figures. For example, it may be exemplified by motor 102 in FIG. 2, and may thus include a rotor 202 which may include one or more permanent magnets. The one or more permanent magnets on the rotor 202 may include four poles; alternatively the permanent magnet may include two, six, or another number of poles. The motor may also include a stator 204. The stator 204 may be positioned around the rotor 202, and may include a plurality of electromagnets 206. For example, there may be six electromagnets 206 on the stator 204, which may operate as three pairs of electromagnets 206. Each pair 302, 304, 306 of electromagnets may be positioned opposite one another. The plurality of electromagnets 206 may be evenly distributed around the stator 204. Various ones of the electromagnets may be driven with various voltages and currents at different times and/or in different phases to electromagnetically induce the rotor 202 to rotate.

The method illustrated in FIG. 6 and described below may operate in iterative fashion according to various embodiments. As the rotor 202 rotates, control of the motor 102 may need to be adjusted frequently, e.g. to commutate the electromagnets at appropriate times for efficient motor operation. Thus some or all of the steps of the method described below may be repeatable according to various embodiments over an indefinite number of iterations during the operation of the motor 102. The method may be implemented in drive control logic 502 shown in FIG. 5, for example. In some embodiments, logic 502 (which implements the method described herein) may include a processor, e.g., a microcontroller, executing instructions comprised on a memory medium; a state-machine based digital controller; and/or a mixed signal application specific integrated circuit (ASIC). Alternatively, the method may be implemented by any combination of the above.

In 602, a pulse-width modulation (PWM) duty cycle may be calculated. More generally, the value of one or more control signals used to control power delivered to the electromagnets may be calculated. The PWM duty cycle may be calculated based on a minimum duty cycle and an input command.

The minimum duty cycle may be the minimum duty cycle required to drive the coils of the electromagnets on the stator. The input command may be scalable from a zero value, or, in some embodiments, a small non-zero value, in which case the PWM duty cycle would be (either exactly or approximately) the minimum duty cycle, to a maximum value, in which case the PWM duty cycle would drive the motor with the maximum drive current available for the motor. An initial input command may be preset, or alternatively may be received from a control device. The input command may be updated periodically by the control device. The period at which the input command is updated may be longer than the period at which the method may be iterated. In any iterations of the method between updates of the input command, the most recent update of the input command may continue to be used for the PWM duty cycle calculations.

An update to the input command may indicate a desire to maintain, increase, or decrease the rotational speed of the motor 102. The control device sending the input command and/or input command updates may be a control device, e.g., a fan speed control device. If for example the motor 102 is driving a cooling fan 110, the fan speed control device may update the input command based on one or more temperatures measured in the location to be cooled. Thus in this example, if the temperature measured was too hot, the control device might send an input command to increase the PWM duty cycle drive, e.g. to increase the rotational speed of the rotor 202, thereby increasing air circulation and removing the excess heat. It should be noted that other types of control devices, e.g., for other types of motor loads, are also envisioned. In 604, an induced voltage is sampled at an expected zero crossing to produce a first voltage value. As the rotor 202 (e.g., including a permanent magnet) rotates, it may induce a voltage in each of the plurality of electromagnets 206 as it passes each in turn. When, in the course of driving the motor 102, one of the electromagnets is not actively being driven, e.g. may be unpowered, it may be possible to measure the voltage induced by the rotation of the rotor 202 across that electromagnet. Similar induced voltages may have been sampled at a plurality of prior expected zero crossings. Based on such previous induced voltage samplings, there may be a particular time when the voltage across a particular unpowered electromagnet is expected to cross zero. Thus sampling the induced voltage at this expected zero crossing may provide information indicating the actual position and/or speed of the rotor 202. For example, a small or large positive or negative voltage may indicate that the rotor's 202 position is closer or farther in front of or behind that electromagnet than expected. Sampling of the induced voltage at this expected zero crossing is referred to herein as the "first voltage value". The first voltage value may then be used in subsequent steps to determine any adjustments in motor control.

In an alternate embodiment, Hall elements (Hall effect sensors) are used to detect the absolute position of the rotor, instead of BEMF sampling. In embodiments of the invention which use Hall sensors, certain of the signal processing described herein may be slightly modified. For example, the calculations below would still be performed, but may include an offset and different gain values. As one example, the Hall sensor measurement may be processed to appear as a BEMF signal, and the method described below may then be performed.

In 606, an average of prior voltage values sampled at a plurality of expected zero crossing values and the first voltage value is calculated. The induced voltage across inactive electromagnets may have been similarly sampled at previous expected zero crossings. Thus it may be possible to calculate an average of several previously sampled voltage values together with the first voltage value. For example, the average may include voltage values sampled over a full commutation cycle, e.g., if there are six electromagnets and six phases to a commutation cycle, 5 previous sampled voltage values may be averaged with the first sampled voltage value. The calculated average thus provides an indicator of the recent average error when calculating expected zero crossings.

In 608, the first voltage value is subtracted from the calculated average to produce a delta zero crossing error (ZCE). Real-world conditions inside any motor will be non-uniform; in other words, any fields inside the motor 102, and/or the electromagnets 206, permanent magnets, and other parts or aspects of the motor 102 may not ever be completely uniformly identical. By establishing a non-zero average (in step 606) and subtracting the first voltage value from that average (in step 608), any effects of real-world non-uniformity may be balanced in a given sampled voltage over an entire commutation cycle. Thus using this delta zero crossing error (after further calculations) as part of motor control may be a way to keep the rotor magnetics substantially optimally aligned to the driving stator electromagnetics.

In 610, the delta zero crossing error may be used to update an integral term associated with the rotational period of the rotor. In one sense, the value of the integral term may represent a timing value associated with the commutation period of the motor. The rotational period represented by the integral term may be used (e.g., directly or indirectly) to run the motor 102 at an ideal efficiency given the current state of the motor 102, as represented by the first sampled voltage value and the previously sampled voltage values. Overall, the ZCE may be used in conjunction with the integral term in controlling how power is delivered to each respective coil in the electromagnets of the stator. The sign of the ZCE may be identified/determined, and used to add or subtract one count from the current value of the integral term according to the sign of the ZCE. The integral term may be updated periodically and multiple times during each rotational period, as will be further described below with respect to FIGS. 7a/b. The ZCE may then be subtracted from the integral term, and the resulting value may be used directly as the rotational period for determining the commutation timing of the electromagnets. In this way, one or more time values may be generated from the integral term and the ZCE, and the one or more time values may be used for controlling commutation for the rotating motor (614).

The seed (or initial value) for the integral term may be specified in a variety of ways. In one embodiment, the seed for the integral value is the final rotational period value used during forced commutation (FC) of the motor, as described in U.S. patent application Ser. No. 12/620,656, which was incorporated by reference above. Similarly, an initial value for the control signal (e.g. initial duty cycle value of a PWM signal) may be specified as the final control signal value used during forced commutation (again, as described in U.S. patent application Ser. No. 12/620,656). It should also be noted that the count by which the integral term is incremented and/or decremented may represent a specified time unit. For example, one count may represent a specific number of seconds, or a fraction of a specified rotational period, or some similar value.

The one or more time values generated from the integral term and the ZCE may represent a period, for example, the period of time for a portion of a revolution of the rotor. The period could be 7.5 degrees or $1/48^{th}$ of a mechanical revolution. The one or more time values may represent an amount of time before the next commutation of the electromagnets. In other words, the one or more time values may represent the next expected zero crossing value.

In 614, the operation of the motor 102 may be controlled based on the one or more time values and the PWM duty cycle. As noted above, the one or more time values may represent an amount of time before the next commutation of the electromagnets. The one or more time values may also represent the next expected zero crossing value. These values may be the same value, or different values. The electromagnets may be commutated based on the value, e.g. at a time indicated by the value(s). The next zero crossing voltage value may also be sampled based on the value, e.g. at a time indicated by the value(s).

As previously noted, in some embodiments the method shown in FIG. 6 may be repeated, e.g., over a plurality of iterations. One possible way of enabling continuous reiteration of the method could be performed as follows. One of the one or more time values might be a next expected zero-crossing value. The following iteration might then include using the next expected zero crossing value as its first expected zero crossing value. The PWM duty cycle might be calculated based on the minimum duty cycle and the same input command as the previous iteration, if the input command has not been updated. Alternatively, the PWM duty cycle may be calculated based on the minimum duty cycle and an updated input command. The remaining steps of the method may then again be performed in a similar manner to produce steady state operation of the motor.

In some embodiments, the method may be performed at specific regular time intervals, such as once every 1 ms. In other embodiments, the method may be performed at regular angular intervals, which may be at variable time intervals. For example, the method may be performed 12 times per mechanical revolution, or once every 30 degrees of rotation; this interval would be a variable amount of time depending on how fast the motor is spinning. Alternatively, the method may rely on two or more asynchronous control loops. In such cases different portions of the method may be performed at different regular (variable or specific) intervals, while the method as a whole may be performed at irregular intervals. In one set of embodiments, there may be a commutation loop which may be responsible for sampling induced voltages (e.g., step 604) at specific times, e.g., at the one or more time values generated in step 612. In some embodiments, the commutation loop may also be responsible for commutating the electromagnets (e.g., part of step 614). The commutation loop may also be responsible for calculating the delta zero crossing error (e.g., steps 606 and 608). There may also be a speed control loop that uses the delta zero crossing error to generate the one or more time values (e.g., steps 610 and 612). In some embodiments, the speed control loop may also be responsible for determining the PWM duty cycle (e.g., step 602).

The control loops may operate at different rates, e.g., asynchronously. For example, the commutation loop may operate at a variable speed depending on the speed of the motor, while the speed control loop may operate at a fixed rate, such as every 1 ms. In these embodiments, the steps of the method may not have a fixed order; for example, some steps may be repeated multiple times before others are performed. If, for example, the motor was spinning at a high rate, such as 8000 rpm, the commutation loop may commutate the electromagnets, sample a first voltage value, calculate an average of a plurality of sampled voltage values, and subtract the first sampled voltage value from the calculated average to produce a delta zero crossing error multiple times before the speed control loop gets the (most recent) delta zero crossing error and uses the delta zero crossing error to generate the one or more time values. At other (e.g., slower) motor speeds, it may also be possible that the speed control loop could cycle more often than the commutation loop, e.g., may continue to re-use the same delta zero crossing error value until the commutation loop samples a next sampled voltage and calculates a new delta zero crossing error.

The input command, as noted above, is a command that together with a minimum duty cycle, may be used to calculate the PWM duty cycle. In other words, the input command may be a means for a control device to input a desired rotational speed into the control algorithm. In some embodiments, the input command may also be used as part of the generation of one or more time values. The input command may be updated periodically. In other words, the input command may be updatable only at a specific interval. The interval may be a number of iterations of the method, for example, the input command may be updatable once every 128 iterations of the method. The interval may alternatively be a number of iterations of one of the control loops used to perform the method, for example, the speed control loop. The interval may be an adjustable interval. The interval may be adjusted, for example, after a specific number of intervals have passed since an initial iteration of the speed control loop. For example, the input command may initially be updatable after every 128 iterations (e.g. after 128 ms, in one embodiment), however, after the input command has been updated 8 times, the input command may be updatable after every successive 64 iterations, e.g. the interval may be reduced by a factor of two. The interval may alternatively be reduced by a different factor, or increased, or may be adjusted after a different number of intervals have passed; in general the interval may be adjustable in any number of ways.

The interval may be adjusted more than once, e.g., a plurality of times. For example, after 8 input command updates have been received, the interval might be reduced by a factor of two, and after another 8 (or 16, or another number) input command updates have been received, the interval might be further reduced, again by a factor of two, or by a factor of four, or by some other factor. Other adjustment criteria may also or alternatively be used to determine when the frequency with which the input command is updatable may change, for example based on an amount of time since the initial iteration of the method, based on a current rotational speed of the motor, or any number of criteria.

Each time the input command is updated, the rotational speed of the rotor may change (e.g. over the course of several iterations). This may affect the actual zero crossing values relative to the expected zero crossing values for a number of iterations of the method following the update. For this reason, especially when the motor is just starting to spin, it may be desirable that the input command may only be updated infrequently, e.g., that the adjustable interval initially be relatively long. Thus, a larger number of iterations (e.g. 128 iterations) of the speed control loop may be performed, allowing the average zero crossing error to stabilize (e.g. reach a minimum) before the input command is again updated. On the other hand, once the motor is spinning and the expected zero crossing values are relatively accurate and stable, more frequent updates to the input command may be desirable. Thus, the interval may be reduced (e.g. to 64, 32, or another number of iterations) to improve the motor's response to desired changes in the rotational speed of the motor.

One embodiment of a method for updating the PWM value using the input command, and updating the rotational period using the integral term and the ZCE is shown in FIGS. 7*a/b*. FIG. 7*a* shows a command adjustment timing loop, which is used for updating the value used to calculate the duty cycle of the PWM signals provided to the drivers controlling the coils in the stators. More generally, the value of a control signal used for controlling rotation of the electric motor may be adjusted, even though embodiments disclosed herein are explicitly directed at PWM control and PWM signals. In 702, an integral term (IT) is initialized to have the final IT value from an initial spinning up of the motor performed by way of a forced commutation (for example as described in U.S. patent application Ser. No. 12/620,656, which was incorporated by reference above). Similarly, the PWM Duty Cycle (PDC) may also be initialized to have the final PDC value from the forced commutation of the motor. If the current state (706), indicates that it is not yet time to adjust the input command (CMD), that is, it is not yet time to update the value (CMD_update) used to calculate the PWM duty cycle, a counter may be incremented and then decremented (708 and 710), and the count may be checked (712). If the count is 0, the next state is set to "adjust input command" (716). Otherwise the next state remains the "wait" state. When the current state indicates that it's time to adjust the input command, CMD_update may be decremented (728) or incremented (726) based on whether CMD is less than CMD_update (718) or greater than CMD_update (720). In either case, if a flag indicates that no adjustment is to be made (722, 724) according to any one or more specified conditions, the value of CMD_update is not updated.

The duty cycle of the PWM signal and the value of a Raw Rotational Period (RRP) are updated in 740. The present value of the RRP is set to "IT-ZCE". Section 780 includes steps performed for checking a limit on the present value of the RRP (742). If the RRP is less than a minimum value, then it's set to the minimum value (744), otherwise the rotational period is set to the present value of the RRP (746). Section 782 includes a loop for adjusting the value of the integral term (IC) based on the sign of the ZCE. If the NC_counter indicates that it's time to update (748, yes branch), the IT update counter is incremented (750). If the IT update counter has not reached the specified maximum value (752, no branch), the IT value is not adjusted, and the PWM duty cycle is updated to the calculated value (PDC from 740). Once the IT update counter has reached the specified maximum value (752, yes branch), the IT value may be updated. Thus, the IT update counter is reset (754), and the ZCE value is checked to determine whether it is at least a minimum value (greater than a "dead zone" value) required for adjusting the IT value (756). If the ZCE is not at least the required minimum value (756, no branch), then the IT update counter is incremented (764) but the IT value is not adjusted before updating the PWM duty cycle to the calculated value (PDC from 740). If ZCE is at least the minimum required value (756, yes branch), IT is either incremented (762) or decremented (760) based on the sign of the ZCE value, that is, based on whether ZCE is negative or non-negative (758). The PWM duty cycle may then also be updated to the calculated value (PDC from 740).

According to the embodiments disclosed herein, the ZCE sample point may be shifted closer to the commutation point, which may result in the motor demonstrating a much wider range in load handling capability, and a much faster response, since offsetting the sample to make it occur early allows quicker recovery from dynamic load changes.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a motor comprising a rotor, wherein the motor further comprises a plurality of electromagnets, the method comprising:
    (a) calculating a pulse-width modulation (PWM) duty cycle;
    (b) sampling a voltage induced by rotation of the rotor at a first expected zero crossing value, wherein said sampling produces a first sampled voltage value;
    (c) calculating an average of a plurality of sampled voltage values, wherein the plurality of sampled voltage values comprise the first sampled voltage value and voltage values sampled at a plurality of prior expected zero crossing values;
    (d) subtracting the first sampled voltage value from the calculated average of the plurality of sampled voltage values to produce a delta zero crossing error;
    (e) determining a sign associated with the delta zero crossing error;
    (f) updating an integral term according to the determined sign associated with the delta zero crossing error, wherein the integral term is associated with a specified rotational period;
    (g) subtracting the delta zero crossing error from the updated integral term to produce an updated rotational period value;
    (h) generating one or more time values based on the updated rotational period value; and
    (i) controlling operation of the motor based on the one or more time values and the PWM duty cycle.

2. The method of claim 1, wherein said updating the integral term comprises incrementing or decrementing the integral term according to the determined sign associated with the delta zero crossing error.

3. The method of claim 2, wherein said incrementing or decrementing the integral term comprises incrementing or decrementing by a specified count, wherein the specified count corresponds to a specified time period.

4. The method of claim 1, wherein an initial value of the integral term corresponds to a final rotational period achieved during an initial induced rotation of the rotor.

5. The method of claim 1, wherein said updating the integral term is performed at a different rate than at which the updated rotational period value is produced.

6. The method of claim 1, wherein said generating one or more time values comprises:
    generating one or more time values to represent a period of time that elapses until a next commutation of the plurality of electromagnets.

7. The method of claim 1, wherein said performing (a) through (i) a single time represents performing one iteration; the method further comprising:
    performing a plurality of iterations, wherein in each iteration of the plurality of iterations the one or more time values comprise a next expected zero crossing value, wherein in each present iteration of the plurality of iterations, the next expected zero crossing value of a previous iteration of the plurality of iterations becomes the first expected zero crossing value in the present iteration.

8. The method of claim 1, wherein said calculating a PWM duty cycle further comprises:
    calculating the PWM duty cycle based on a minimum duty cycle and an input command.

9. The method of claim 8, further comprising updating the input command at specified time intervals.

10. The method of claim 9, further comprising dynamically adjusting the specified time intervals.

11. An electronic motor system, comprising
a rotor comprising a plurality of permanent magnet poles;
a stator comprising a plurality of electromagnets;
a voltage sensor configured to measure a voltage induced across an electromagnet of the plurality of electromagnets; and
a logic block configured to:
(a) calculate a pulse-width modulation (PWM) duty cycle;
(b) use the voltage sensor to sample a voltage across the electromagnet of the plurality of electromagnets at an expected zero crossing value to produce a first sampled voltage value, wherein the voltage across the electromagnet is induced by rotation of the rotor;
(c) calculate an average of prior voltage values sampled at a plurality of expected zero crossing values and the first sampled voltage value;
(d) subtract the first sampled voltage value from the calculated average to produce a delta zero crossing error;
(e) determine a sign associated with the delta zero crossing error;
(f) update an integral term according to the determined sign associated with the delta zero crossing error, wherein the integral term is associated with a specified rotational period;
(g) subtract the delta zero crossing error from the updated integral term to produce an updated rotational period;
(h) generate one or more time values based on the updated rotational period;
(i) control operation of the electronic motor based on the one or more time values and the PWM duty cycle.

12. The electronic motor system of claim 11, wherein in updating the integral term, the logic block is further configured to update the integral term at a different rate than a rate at which the logic block updates the rotational period.

13. The electronic motor system of claim 11, wherein in updating the integral term, the logic block is further configured to increment or decrement the integral term by a specified count.

14. The electronic motor system of claim 11, wherein the one or more time values represent a time period.

15. The electronic motor system of claim 14, wherein the time period represents an amount of time that elapses until a next commutation of the plurality of electromagnets.

16. The electronic motor system of claim 11, wherein the logic block performing (a) through (i) a single time represents a single iteration; wherein the logic block is further configured to perform a plurality of iterations, wherein the one or more time values in each of the plurality of iterations comprise a next expected zero crossing value, wherein the logic block is further configured to use the next expected zero crossing value of a most recent previous iteration of the plurality of iterations as the first expected zero crossing value of a present iteration of the plurality of iterations.

17. The electronic motor of claim 11, wherein the logic block is further configured to calculate the PWM duty cycle based on a minimum duty cycle value and an input command representative of a specified duty cycle value.

18. The electronic motor of claim 17, wherein the logic block is further configured to:
periodically update the input command upon expiration of a specified time interval; and
dynamically adjust the specified time interval.

19. The electronic motor of claim 18,
wherein the logic block performing (a) through (h) a single time represents a single iteration;
wherein the logic block is further configured to:
perform a plurality of iterations during the specified time interval; and
adjust the specified time interval based on a number of intervals that have occurred from when the logic block first began to control the electronic motor.

20. The electronic motor of claim 11, wherein the logic block comprises a state-machine based digital controller and a mixed signal application specific integrated circuit.

21. The electronic motor of claim 11, wherein the logic block comprises a computer-accessible memory medium storing program instructions executable by a processor to perform one or more of all functions of the logic block.

22. A circuit for operating an electric motor having a rotor and a plurality of electromagnets, the circuit comprising:
drive control logic configured to:
(a) calculate a pulse-width modulation (PWM) duty cycle;
(b) sample a voltage across at least one electromagnet of the plurality of electromagnets at an expected zero crossing value to produce a first sampled voltage value, wherein the voltage across the at least one electromagnet is induced by rotation of the rotor;
(c) calculate an average voltage value from the first sampled voltage value and prior voltage values sampled at a plurality of expected zero crossing values;
(d) subtract the first sampled voltage value from the calculated average voltage value to produce a delta zero crossing error;
(e) update an integral term based on whether the delta zero crossing error has a positive or negative value, wherein the integral term is associated with a rotational period of the rotor;
(f) subtract the delta zero crossing error from the updated integral term to obtain an updated rotational period value;
(g) generate one or more time values based on the updated rotational period; and
(h) generate one or more control signals based on the one or more time values and the PWM duty cycle; and
drive circuitry configured to:
receive the one or more control signals from the drive control logic, and provide power to the plurality of electromagnets according to the control signals to control rotation of the rotor.

* * * * *